United States Patent [19]

Okino et al.

[11] Patent Number: 4,755,885
[45] Date of Patent: Jul. 5, 1988

[54] ELIMINATING UNDESIRABLE NOISE RECORDATION IN IMAGE SENSING/SOUND RECORDING DEVICE

[75] Inventors: Tadashi Okino, Kanagawa; Akimitsu Miura, Tokyo, both of Japan

[73] Assignee: Canon Kabushiki Kaisha, Tokyo, Japan

[21] Appl. No.: 792,658

[22] Filed: Oct. 29, 1985

[30] Foreign Application Priority Data

Oct. 29, 1984 [JP] Japan .................. 59-225880

[51] Int. Cl.⁴ ............................................. H04N 5/76
[52] U.S. Cl. .................................. 358/335; 358/906; 358/909; 360/19.1
[58] Field of Search ............... 358/335, 906, 909; 360/137, 19.1

[56] References Cited

U.S. PATENT DOCUMENTS 4,530,015 7/1985 Yanagida et al. ................. 358/906

FOREIGN PATENT DOCUMENTS 0127979 8/1982 Japan ................................... 358/906

Primary Examiner—Robert L. Richardson
Attorney, Agent, or Firm—Robin, Blecker & Daley

[57] ABSTRACT

An image sensing device includes a voltage converting device for supplying power for driving a peripheral equipment component such as a flash unit used with the image sensing device, a recording device for recording an audio signal and a control device for prohibiting simultaneous operation of the voltage converting device and the recording device. The control device has a control mode in which both the peripheral equipment and the recording device are used at the time of photography. The control device also has a control mode in which the peripheral equipment is operated in preference to the recording devide. Accordingly, the mixture of noise from the voltage converting device with the audio recording signal is prevented.

19 Claims, 3 Drawing Sheets

ELIMINATING UNDESIRABLE NOISE RECORDATION IN IMAGE SENSING/SOUND RECORDING DEVICE

BACKGROUND OF THE INVENTION

1. Field of the Invention

The present invention relates to an image sensing device or system capable of audio recording, and particularly to an image sensing device used with devices such as an electronic flash component which requires high energy when same is operated

2. Description of the Prior Art

If an electronic flash device is used during audio recording in photography with an image sensing device having an audio recording device of this kind, an oscillation noise and other noises connected thereto are also recorded when the electronic flash device is being charged. Accordingly, the quality of the recorded sound can be remarkably low. The same problem occurs in an image sensing device having a driving device for a physical shutter made of lead lanthanum zirconate titanate (PLZT). Namely, a DC/DC converter is used for the physical shutter of this kind, since a high voltage is required for driving, so that the noise from a charge circuit comprising the DC/DC converter is also recorded during audio recording.

SUMMARY OF THE INVENTION

It is, therefore, an object of the present invention to provide an image sensing device arranged such that when charge means having an oscillation circuit is used during audio recording, charge operation is stopped for a predetermined time in order to avoid noise such as an oscillation noise from being recorded. In this manner a device such as an electronic flash device, a physical property shutter device and similar components which require comparatively high energy can be used with the image sensing device without encountering undesirable noise recording problems.

To attain this object, according to an embodiment of the present invention, an image sensing device includes voltage converting means for forming energy for driving a peripheral equipment component, recording means for recording an audio signal, and control means for prohibiting simultaneous operation of the voltage converting means and the audio recording means.

According to another embodiment, the control means has a control mode in which both the peripheral equipment and the recording means are used at the time of photography.

According to a further embodiment, the control means has a control mode in which the peripheral equipment is operated in preference to the recording means.

Since the image sensing device of the present invention is arranged such that an audio recording device is provided, and an operation of the voltage converting means is stopped for a predetermined time during audio recording when the peripheral equipment such as an electronic flash device which requires high energy is used, the noise due to the voltage converting means is not recorded. Accordingly, it is possible to use a peripheral equipment component such as an electronic flash device which requires high energy without causing deterioration of recorded sound quality.

Further features and advantages of the present invention will be apparent from the following description of the preferred embodiments thereof with reference to the accompanying drawings.

DETAILED DESCRIPTION OF THE PREFERRED EMBODIMENTS

The present invention will be described in detail with reference to the accompanying drawings of the embodiment thereof.

Figure 1:
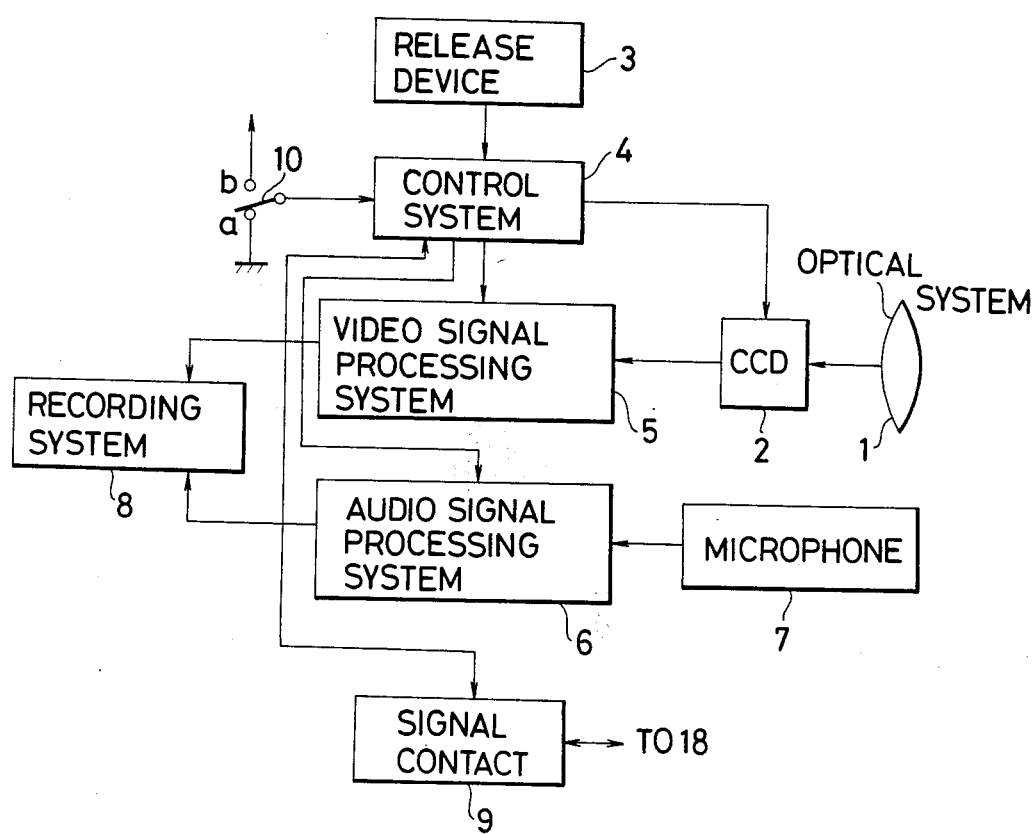
FIGS. 1 and 2 are, respectively, block diagrams of an image sensing device, and an electronic flash device according to an embodiment of the present invention.
Figure 2:
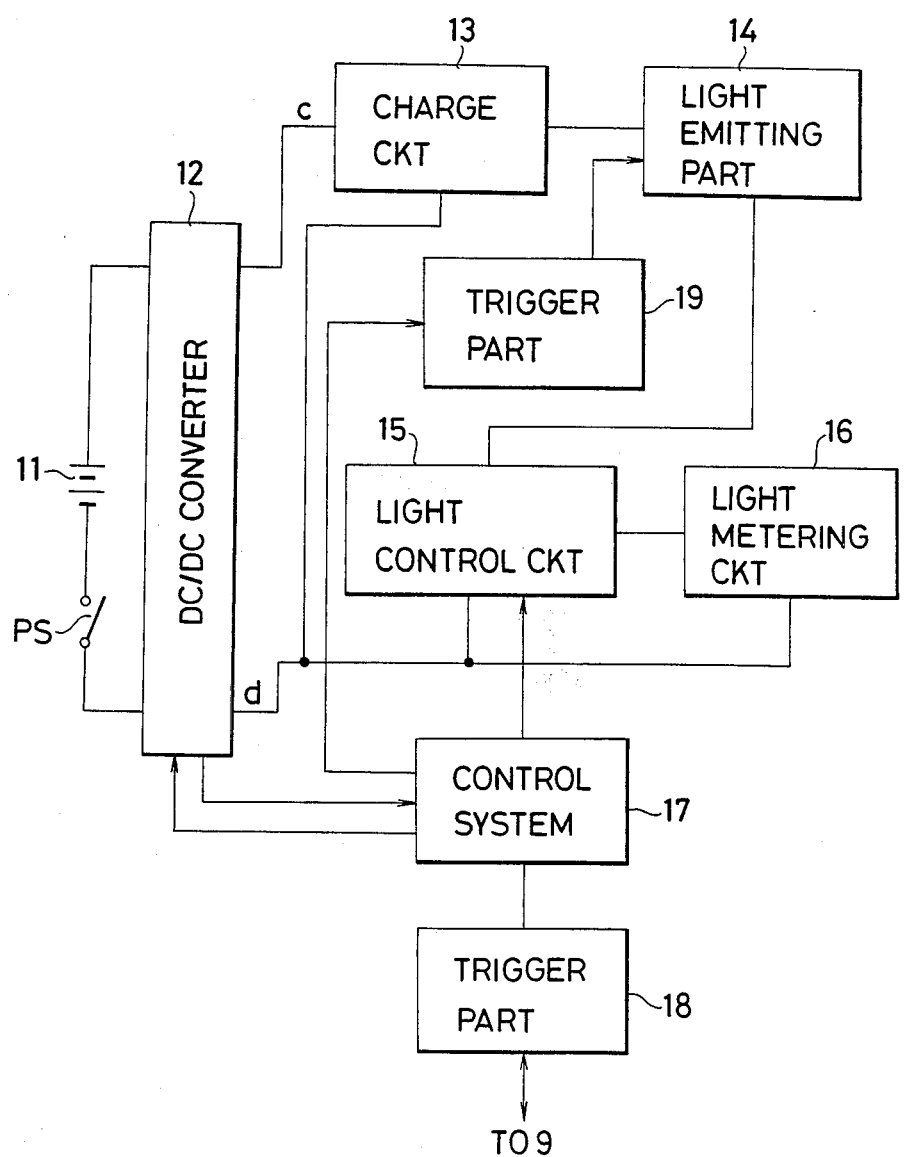

FIGS. 1 and 2 are, respectively, block diagrams of an image sensing device, and an electronic flash device according to an embodiment of the present invention. In this embodiment, there are provided control means for stopping or disabling the charge operation of the electronic flash device for a predetermined period during audio recording, and mode change-over means having a control mode for selectively prohibiting an audio recording operation for a predetermined period during the charge operation of the electronic flash device at the time of photography.

In the image sensing device shown in FIG. 1, 1 is an optical system including a lens etc., 2 is a charge-coupled device (CCD) operating as an image sensing element, 3 is a release device for causing the image sensing device to record an image signal, 4 is a first control system operating as control means for the image sensing device, 5 is a video signal processing system, 6 is an audio signal processing system, 7 is a microphone for picking up the sound, 8 is a recording system for the video signal and the audio signal operating as recording means, and 9 is a signal contact for exchanging signals between the image sensing device and the electronic flash device shown in FIG. 2. 10 is a mode selection switch for selectively changing over an audio recording priority mode (contact a) and an image sensing priority mode (contact b) for the first control system 4.

In the electronic flash device shown in FIG. 2, 11 is a power source battery, PS is a power source switch for the electronic flash device, 12 is a boosting DC/DC converter operating as voltage converting means including an oscillation circuit, 13 is a charge circuit for a capacitor, 14 is a light emitting part such as a flash tube operating as flash emitting means, 15 is a light control circuit, 16 is a light metering circuit, 17 is a second control system for switching on and off oscillations for controlling light emission and for changing the light amount etc., 18 is a signal contact for exchanging signals between the electronic flash device and the image sensing device (FIG. 1), and 19 is a trigger part.

Figure 3:
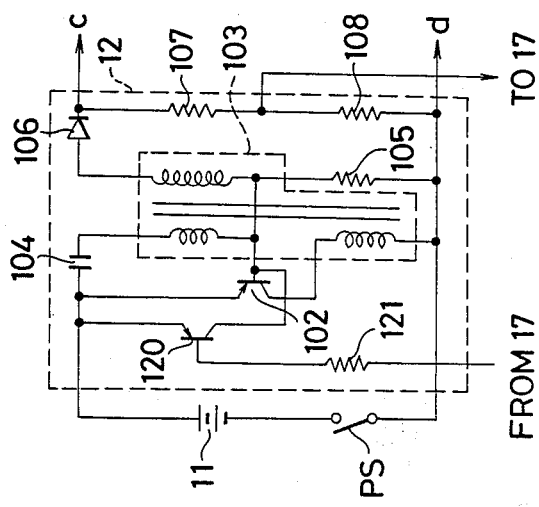
FIG. 3 is a circuit diagram of a DC/DC converter.

FIG. 3 is a circuit diagram of the DC/DC converter 12. In the drawing, 120 is a switching transistor for switching on and off oscillation operation of the DC/DC converter 12, 102 is an oscillation transistor, 103 is an oscillation transformer, 104 is a capacitor, 105, 107 and 108 are resistors, and 106 is a rectifying diode. A signal at the contact point between the resistors 107 and 108 is supplied to the control system 17, serving a charge completion signal and a signal indicating whether the capacitor 104 is being charged or not.

An operation where electronic flash device component (FIG. 2) is connected to the image sensing device (FIG. 1) via the signal contact 18 will be described.

The release device 3 (such as a button) of the image sensing device is provided, for example, as a two-stroke condition device. When the release device 3 is depressed to a first stroke condition, audio recording is started, while an operation such as light measurement necessary for deciding the exposure is carried out. When the release device 3 is depressed to a second stroke condition, video recording is started, while audio recording is stopped after the lapse of a predetermined time from the second stroke. (Although it is possible to control the timing such that the sound for a predetermined time before and after second stroke condition can automatically be picked up, in the present embodiment the audio recording operation is carried out according to the above-mentioned timing.)

When the release device 3 of the image sensing device is depressed down to the first stroke condition, the first control system 4 operates as follows according to the condition of contacts of the mode selection switch 10.

(1) In the case of an audio recording priority mode:

Normally, a contact of the switch 10 is at the side of the terminal "a", namely in an audio recording priority mode. In this condition, the control system 17 judges from the potential between the resistors 107 and 108 whether the DC/DC converter 12 of the electronic flash device is in an operative state or not. When it is judged that the converter 12 is in an operative state, a signal is transmitted from the first control system 4 of the image sensing device to the second control system 17 of the electronic flash device via the signal contacts 9 and 18. The second control system 17 supplies an oscillation stop signal of a low level to the transistor 102 of the DC/DC converter 12 to stop the charging oscillation, so that no noise is recorded.

In the present embodiment, at this time, audio recording starts with the first stroke of the release device 3 and continues until the release of the first stroke. Further, in a case where the release device 3 is depressed down to the second stroke before releasing the first stroke, audio recording stops after the lapse of a predetermined time from the second stroke. Thus, when the switch 10 is at the side of the terminal "a", the transistor 102 is turned on while the release device 3 is being depressed down to the first stroke or until a predetermined time passes after the release device 3 is depressed down to the second stroke, and the DC/DC converter 12 stops the oscillation operation.

(2) In the case of an image sensing priority mode:

When the contact of the mode selection switch 10 is changed over to the side of the contact "b", namely in an image sensing priority mode, in the same way as in the case of (1), the second control system 17 judges whether the DC/DC converter 12 of the electronic flash device is in an operative state or not. When it is judged that the converter 12 is in an operative state, the second control system 17 supplies a signal to the first control system 4 of the image sensing device via the signal contacts 18 and 9. The first control system 4 supplies a prohibiting signal to the audio signal processing system 6 to stop audio recording.

Figure 4:
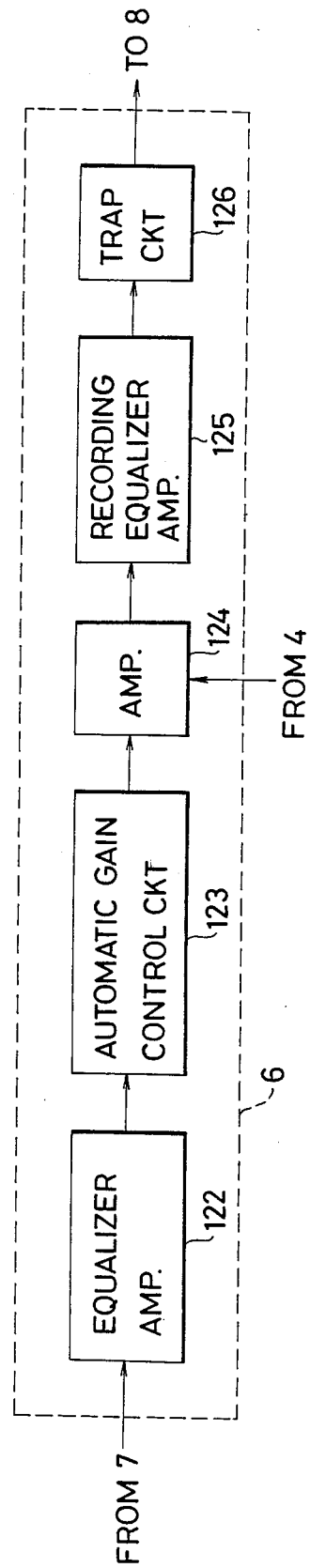
FIG. 4 is a block diagram of a sound processing circuit.

More particularly, FIG. 4 is a block circuit diagram of the audio signal processing circuit 6. 122 is a head equalizer amplifier for controlling the frequency characteristics of an audio signal picked up by the microphone 7, 123 is an automatic gain control circuit, 124 is an amplifier capable of adjusting the gain from outside, 125 is a recording equalizer amplifier for controlling the frequency characteristics of the recorded signal according to the recording characteristics for recording, and 126 is a trap circuit.

When the DC/DC converter 12 is in an operative state, the above prohibiting signal is supplied from the control system 4 to the amplifier 124 so as to make the gain of the amplifier 124 zero. Thus, while the DC/DC converter 12 is operating, no sound is recorded.

In the cases of (1) and (2), flash photography or audio recording is carried out according to the selection of the case (1) or (2), when the release device 3 of the image sensing device is depressed down to the second stroke.

In the case of (1), the DC/DC converter 12 does not operate during audio recording, during which only the charge operation is not carried out. When photography starts with the second stroke, the electronic flash device emits a flash.

The above embodiment is arranged such that besides the audio recording mode there is provided the image sensing priority mode so as to carry out the mode change-over by means of the selection switch 10, and however it is evident that only the audio recording priority mode can be provided.

Further, in the above embodiment, the first stroke operation of the two-stroke type release device 3 of the image sensing device is made use of as an audio recording switch. However, it is possible to use a separately provided switch and such as a recording switch.

Further, the above embodiment can be made as one body, i.e., integral with the image sensing device or it can be a separate unit.

Further, it goes without saying that the present invention can be applied not only for the electronic flash device but also for cases in which a device such as a physical shutter, diaphragm and which reguire high energy or high voltage used.

As described above, the image sensing device of the present invention having an audio recording device is arranged such that voltage converting means is stopped for a predetermined time during audio recording when a peripheral equipment component such as an electronic flash device which requires high energy at the time of photography is used. Accordingly, the noise due to the voltage converting means cannot be recorded, and peripheral equipment component can be used without deterioration of the quality of recorded sound.

What is claimed is:

1. An image sensing device comprising:
   (a) image sensing means for converting an optical image into an electrical video signal;
   (b) audio pick-up means for picking up audio information;
   (c) recording means for recording outputs of said image sensing means and said audio pick-up means;
   (d) an electrical power operated peripheral equipment component;
   (e) electric power supply means connected with said peripheral equipment component for supplying power thereto; and
   (f) control means connected with said power supply means for disabling power supply therefrom to said peripheral equipment component during audio recording by said recording means.

2. An image sensing device according to claim 1, wherein said audio pick-up means includes a microphone.

3. An image sensing device according to claim 1, wherein said peripheral equipment component comprises an electronic flash device.

4. An image sensing device according to claim 1, wherein said peripheral equipment component is made integral with said image sensing device.

5. An image sensing device according to claim 1, wherein said peripheral equipment component is a component separate from said image sensing device but connectable therewith to be operated thereby.

6. An image sensing device according to claim 1, wherein said power supply source includes a converter for boosting DC voltage from source level thereof to a higher voltage to operate the peripheral equipment component.

7. An image sensing device according to claim 1, wherein said power source includes an oscillation circuit.

8. An image sensing device according to claim 7, wherein said control means disables said oscillation circuit during audio recording.

9. An image sensing device comprising:
   (a) image sensing means for converting an optical image into an electrical video signal;
   (b) audio pick-up means for picking up audio information;
   (c) recording means for recording at least an output of said audio pick-up means;
   (d) an electrical power operated peripheral equipment component;
   (e) an electric power supply means connected with said peripheral equipment component for supplying power thereto; and
   (f) control means connected with said power supply means for disabling power supply therefrom to said peripheral equipment component during audio recording by said recording means.

10. An image sensing device comprising:
    (a) image sensing means for converting an optical image into an electrical video signal;
    (b) audio pick-up means for picking up audio information;
    (c) recording means for recording outputs of said image sensing means and said audio pick-up means; and
    (d) an electrical power operated peripheral equipment component;
    (e) an electric power supply means connected with said peripheral equipment component for supplying power thereto; and
    (f) control means for controlling the state of audio recording by said recording means according to the operation state of said power supply means.

11. An image sensing device according to claim 10, wherein said control means prohibits audio recording by said recording means during the operation of said power supply means.

12. An image sensing device according to claim 10, wherein said audio pick-up means includes a microphone.

13. An image sensing device according to claim 10, wherein said peripheral equipment component comprises an electronic flash device.

14. An image sensing device according to claim 10, wherein said peripheral equipment component is made integral with said image sensing device.

15. An image sensing device according to claim 10, wherein said peripheral equipment component is a component separate from said image sensing device but connectable therewith to be operated thereby.

16. An image sensing device according to claim 10, wherein said power supply source includes a converter for boosting DC voltage from source level thereof to a higher voltage to operate the peripheral equipment component.

17. An image sensing device according to claim 10, wherein said power source includes an oscillation circuit.

18. An image sensing device according to claim 17, wherein said control means controls the audio recording state of said recording means according to the operation state of said oscillation circuit.

19. An image sensing device according to claim 18, wherein said control means prohibits audio recording by said recording means during the operation of said oscillation circuit.

* * * * *